(No Model.)  2 Sheets—Sheet 2.
G. H. SMITH.
STREET CAR FENDER.
No. 604,944. Patented May 31, 1898.
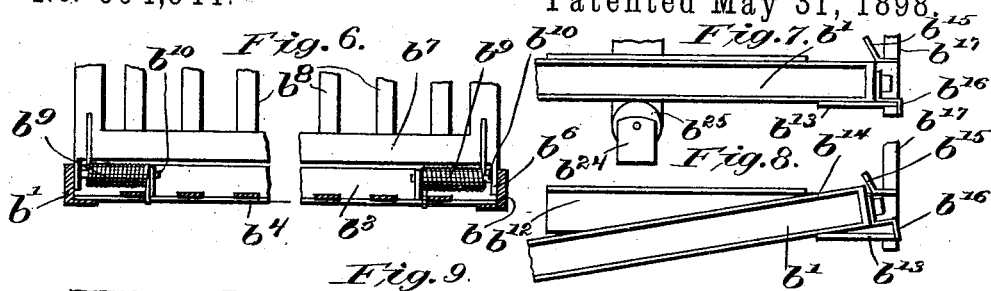
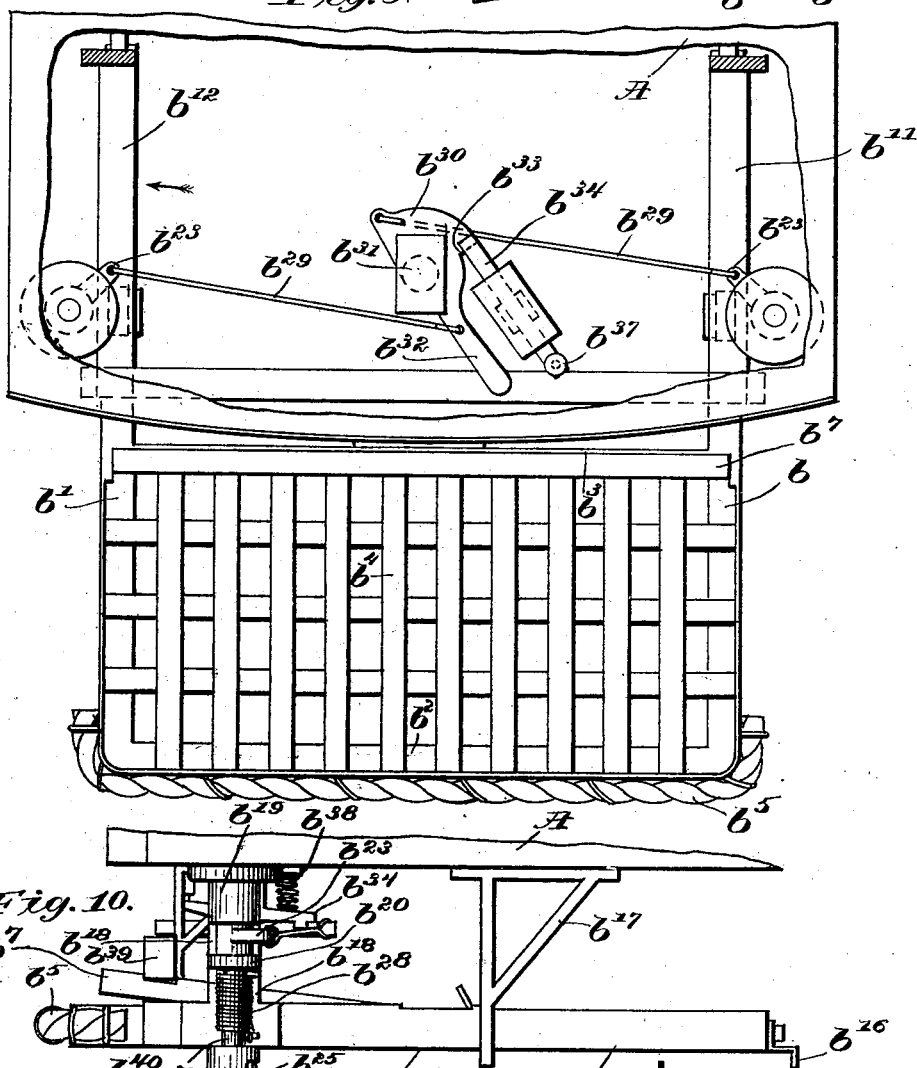
WITNESSES.
Kirkley Hyde.
Thomas J. Drummond
INVENTOR
George H. Smith.
By Crosby & Gregory,
ATTORNEY.

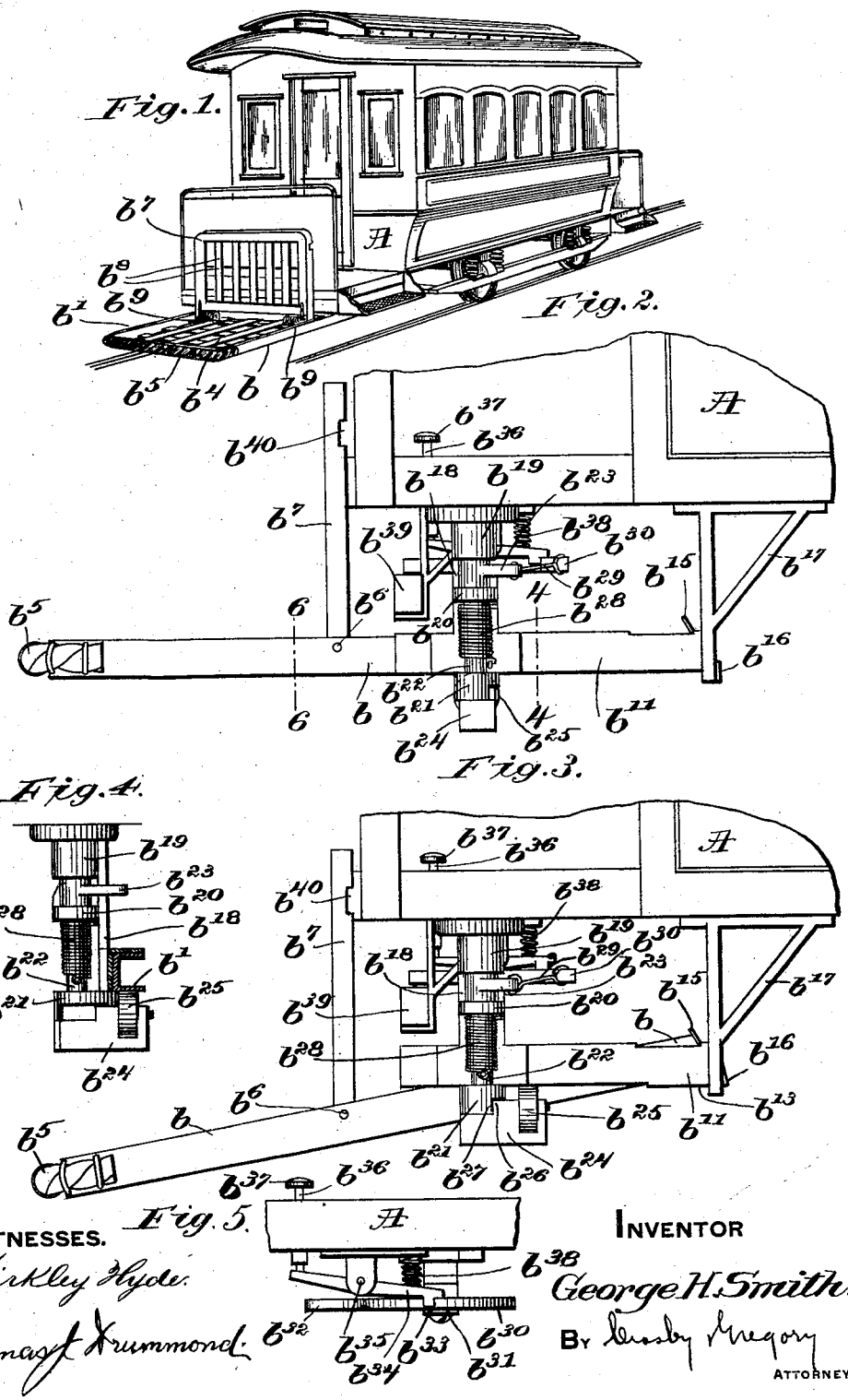

UNITED STATES PATENT OFFICE.

GEORGE H. SMITH, OF LOWELL, MASSACHUSETTS.

STREET-CAR FENDER.

SPECIFICATION forming part of Letters Patent No. 604,944, dated May 31, 1898.

Application filed January 12, 1898. Serial No. 666,400. (No model.)

*To all whom it may concern:*

Be it known that I, GEORGE H. SMITH, of Lowell, county of Middlesex, State of Massachusetts, have invented an Improvement in Street-Car Fenders, of which the following description, in connection with the accompanying drawings, is a specification, like letters on the drawings representing like parts.

My invention is an improvement in car-fenders, and has for its primary object the provision of automatic means for maintaining the fender projected in operative position, while permitting it to move rearwardly to prevent its destruction, also automatic means for locking the fender in inoperative position and simplified supporting and releasing devices for permitting the fender to drop in order to catch any desired object.

The details of my invention will be more fully described hereinafter, and the invention will be more particularly defined in the appended claims.

In the drawings illustrative of the preferred embodiment of my invention, Figure 1 is a perspective view of a usual street-car provided with my improved fender. Fig. 2 is an enlarged fragmentary view thereof in side elevation, showing the fender projected and held in raised position. Fig. 3 is a similar view showing the fender dropped in position to catch an object. Fig. 4 is a cross-sectional view on the line 4 4, Fig. 2. Fig. 5 is a fragmentary detail in elevation, showing the releasing mechanism therefor. Fig. 6 is a transverse section on the line 6 6, Fig. 2. Figs. 7 and 8 are enlarged details of the slideway and rear end of the fender, looking in the direction of the arrow, Fig. 9, and showing, respectively, the fender in raised and in fallen position. Fig. 9 is a top plan view of the fender, parts being shown in section and the street-car platform being broken away in order to reveal the mechanism below it. Fig. 10 is a side elevation of a fender in supported retracted position.

My invention may be applied to any usual street-car A. It comprises a framework, herein shown as consisting of opposite longitudinal L-beams $b$ $b'$, connected at their forward ends by a cross-bar $b^2$ and intermediate their ends by a brace $b^3$, a suitable supporting-bottom $b^4$ being provided for the forward portion thereof and being herein shown as formed by a plurality of spring-slats crossing each other at right angles. At the forward edge thereof I provide a suitable buffer, herein shown as in the form of a strand of coarse rope or cable $b^5$, bound on the fender.

Adjacent the brace $b^3$ I pivot at $b^6$ an apron $b^7$, containing spring-slats or other cushioning material $b^8$, said apron being normally held in raised position, as shown in Figs. 1 to 3 and 6, by comparatively stiff springs $b^9$, herein shown as coiled about the pintles $b^{10}$ of the pivotal connection $b^6$.

The L-beams $b$ $b'$ are mounted to reciprocate, when required, in opposite housings $b^{11}$ $b^{12}$ of an inverted-L shape in cross-section, as clearly shown in Fig. 4, the rear ends thereof being provided on their under sides with bottom ledges $b^{13}$, Figs. 7 and 8, projecting toward each other and being cut away opposite said ledges, guards $b^{15}$ being provided in order to properly guide the ends of the beams $b$ $b'$ as the latter tip from the position shown in Fig. 7 to the position shown in Fig. 8, this tipping occurring when the fender is dropped, as shown in Fig. 3, as will be presently described.

Stops $b^{16}$ are secured to the ends of the beams $b$ $b'$ in order to limit their forward movement.

The housings $b^{11}$ $b^{12}$ are rigidly supported at their rear ends by brackets $b^{17}$ and at their forward ends by brackets or posts $b^{18}$. Each post $b^{18}$ is recessed between and below an upper hub portion $b^{19}$, intermediate ledge or bracket $b^{20}$, and a lower hub portion $b^{21}$ to receive a shaft $b^{22}$, rotatably journaled therein and provided at its upper end with a lever $b^{23}$ and at its lower end with an arm $b^{24}$.

The arms $b^{24}$ have journaled transversely in their free ends rollers $b^{25}$ and are provided with shoulders $b^{26}$, adapted to engage opposing shoulders $b^{27}$ of the hubs $b^{21}$ to limit their outward movement, the shafts $b^{22}$ and arms $b^{24}$ being normally held under a constant tendency to assume the position shown in Fig. 3 by means of coiled springs $b^{28}$, surrounding the shafts, as clearly shown in the drawings.

The levers $b^{23}$ are connected by cords or cables $b^{29}$ with the opposite ends of a hand-lever $b^{30}$, pivoted to a king bolt or stud $b^{31}$ on the bottom of the car, said lever $b^{30}$ having a handle $b^{32}$ at its forward end and being provided with a notch $b^{33}$ at one side to be engaged by a dog $b^{34}$, as clearly shown in Figs. 5 and 9, said dog being pivoted at $b^{35}$ to the bottom of the platform to be engaged and tripped by a plunger $b^{36}$, whose head $b^{37}$ projects in convenient position to be operated by the foot of the car-driver or motorman.

The dog $b^{34}$ is normally held in position to engage $b^{33}$ of its lever by a spring or other means $b^{38}$.

I regard the features of my invention last described as of considerable importance, inasmuch as they conspire to permit instant and easily-operated dropping movement of the fender. Other mechanism has been proposed for accomplishing a somewhat similar movement, (see United States Patent No. 563,062 to Pullan,) but its operation is liable to be uncertain and slow, whereas by connecting the cables $b^{29}$, as shown in my invention, with the opposite ends of the lever $b^{30}$ and across said lever instead of being wrapped around a post or drum, as in said patent, a very much less pressure on the plunger by the foot of the motorman is necessary, and thereby the trip is rendered much more delicate and certain in operation, and also there is no liability whatever of the parts getting caught or stuck, so as to be temporarily inoperative. Furthermore, by my invention there is a minimum of pressure on the lever $b^{30}$, and consequently a minimum resistance of the notch $b^{33}$ against the dog $b^{34}$, because the latter has to resist only the action of the springs $b^{28}$ and does not sustain the weight of the fender, as in the before-mentioned patent.

Accordingly I consider that I have made a considerable advance over the device of said patent by thus obviating these serious objections. Further advantages will also be presently pointed out.

Depending from the front of the car I mount a bolster $b^{39}$ and provide notches $b^{40}$ adjacent the upper and forward ends of the apron $b^7$, said notches coöperating with said bolster to lock the fender in its retracted position when it is slid back into the housing $b^{11}$ $b^{12}$ into the positions shown in Fig. 10, as will be clearly understood viewing said figure.

The operation of my improved fender is as follows: When not in use, it will be slid back to the position shown in Fig. 10. Supposing now that the car is to be put in service, the attendant depresses the projecting end of the apron $b^7$, so as to disengage its notch $b^{40}$ from the bolster $b^{39}$, and simultaneously draws forward the fender, the latter sliding freely over the antifriction-rolls $b^{25}$, which constitute a track therefor, the fender being stopped at its proper forward position by the stops $b^{16}$, which engage the ledges $b^{13}$ at the rear end of the housings. The springs $b^9$ cause the apron $b^7$ to press forcibly against the dashboard of the car and serve to maintain the fender in proper projected position, as shown in Fig. 2. This feature of my invention is of considerable importance, inasmuch as while it maintains the fender in proper working position the latter is at all times free to yield to a rigid obstruction if one should be met with, and this capability thereby permitting the fender to move backwardly when absolutely necessary, rather than to be smashed in pieces, the fender, however, being held forward with sufficient firmness and certainty at all times for life-saving purposes.

Whenever a motorman sees a person or other object in danger of being struck by the car, he simply presses lightly with his foot upon the step $b^{37}$ of the plunger, thereby lifting the dog $b^{34}$ against the action of its spring $b^{38}$, so as to disengage it from the notch $b^{33}$ of the trip-lever $b^{30}$, whereupon the springs $b^{28}$ of the hangers or shafts $b^{22}$ instantly rotate two arms $b^{24}$ from beneath the fender, permitting the latter to drop close down to the track into the position shown in Fig. 3, all ready to catch and save said object or person. At the same time the said falling of the forward end of the fender causes the rear end thereof, as shown in Fig. 8, to turn upwardly against the guard $b^{15}$, thereby holding the fender from accidental rearward movement, which would collapse the fender and injure the object or person being caught.

Viewing Fig. 4, it will be evident that very little power is required to move the roller $b^{25}$ from beneath the fender-beams, the roller turning readily and moving on the smooth under surface of the beams.

When it is desired to restore the fender to its raised position, this is very quickly done simply by raising the fender from its dropped position, Fig. 3, to its horizontal position, Fig. 2, whereupon the hand-lever $b^{32}$ is turned into the position in Fig. 9, permitting the dog $b^{34}$ to automatically lock it and retain the arms $b^{24}$ in supporting engagement beneath the fender.

While I have herein described my invention in its details of construction, I wish it understood that I am not limited to said details, inasmuch as many changes and substitutions may be resorted to without departing from the spirit and scope of my invention.

Having fully described my invention, what I claim as new, and desire to secure by Letters Patent, is—

1. The combination with a street-car, of ways rigidly mounted beneath the car, a fender reciprocable in said ways, said fender having pivoted intermediate its length an apron automatically held turned up against the front of the car, and holding the fender yieldingly forward in projected position, and springs normally holding said apron forcibly in its upright position, substantially as described.

2. The combination with a street-car, of ways rigidly mounted beneath the car, a fender reciprocable in said ways, said ways being open at their under sides, cut away at their rear upper ends and provided with bottom ledges opposite said cut-away portions, guards being provided opposite said ledges, and removable means adjacent the forward ends of said ways for normally sustaining said fender and permitting it to drop when desired, whereby said fender at its rear end in dropping is caused to turn on said bottom ledges and abut against said guards, as and for the purpose described.

3. The combination with a street-car, of ways rigidly mounted beneath the car, a fender reciprocable in said ways, said fender having pivoted intermediate its length an apron adapted to be turned up against the front of the car, and springs normally holding said apron forcibly in its upright position, said apron having notches in its upper edge adjacent its free end and a device rigidly mounted beneath the forward end of the car to be engaged by said notches when the fender is in retracted position as and for the purpose described.

4. The combination with a street-car, of a support for a fender, a fender carried by said support, depending posts adjacent the front end of the car, shafts rotatably mounted in said posts, said shafts having lateral arms at their lower ends provided with antifriction-rollers, springs engaging said posts, and said shafts tending to maintain said arms normally turned outward, levers projecting from said shafts, a trip-lever mounted beneath the car, connections between said levers and said trip-lever whereby the latter operates the former and said shafts, a dog adapted to engage said trip-lever when the latter is in position to turn said arms inwardly beneath and to support said fender, and means for disengaging said dog to permit said springs to turn said arms from supporting engagement with the fender, substantially as described.

5. The combination with a street-car, of ways, a fender reciprocable therein and when in projected position being capable of dropping therefrom at its forward end, vertical posts pivotally mounted adjacent the forward ends of said ways, said posts having lateral arms provided with friction-rollers adapted to be turned inwardly beneath the fender, said fender being supported by and freely movable on said rollers, springs normally tending to turn said arms and their shafts away from each other out of supporting engagement with said fender, means for holding said arms in said supporting engagement against the action of said springs, and releasing means therefor, substantially as described.

6. The combination with a street-car, of ways, a fender reciprocable therein and when in projected position being capable of dropping therefrom at its forward end, vertical posts pivotally mounted adjacent the forward ends of said ways, said posts having lateral arms provided with friction-rollers adapted to be turned inwardly beneath the fender, said fender being supported by and freely movable on said rollers, springs normally tending to turn said arms and their shafts away from each other out of supporting engagement with said fender, means for holding said arms in said supporting engagement against the action of said springs, and releasing means therefor, said fender having an apron pivoted thereto, springs normally holding said apron in upright position, notches near the forward end of the apron, and a device carried beneath the forward end of the car to be engaged by said notches and thereby retain the fender when in retracted position, substantially as described.

In testimony whereof I have signed my name to this specification in the presence of two subscribing witnesses.

GEORGE H. SMITH.

Witnesses:
SAMUEL TEMPLE,
FANNIE L. SMITH.